United States Patent [19]

Blanke et al.

[11] 3,815,679

[45] June 11, 1974

[54] SECONDARY OIL RECOVERY PROCESS USING BETA-SUBSTITUTED ACRYLAMIDE POLYMERS

[75] Inventors: James F. Blanke, Minneapolis, Minn.; Charles A. Christopher, Jr., Houston, Tex.

[73] Assignee: Texaco Inc., New York, N.Y.

[22] Filed: Nov. 17, 1972

[21] Appl. No.: 307,705

[52] U.S. Cl............. 166/275, 166/274, 252/8.55 D
[51] Int. Cl............................................. E21b 43/22
[58] Field of Search........................... 166/273–275; 252/8.55 D

[56] References Cited
UNITED STATES PATENTS

| 3,039,529 | 6/1962 | McKennon | 166/275 |
| 3,282,337 | 11/1966 | Pye | 166/275 |
| 3,370,649 | 2/1968 | Wolgemuth | 166/274 |
| 3,399,725 | 9/1968 | Pye | 166/275 |
| 3,476,186 | 11/1969 | Sarem | 166/275 X |
| 3,543,855 | 12/1970 | Blatz et al. | 166/275 X |
| 3,679,000 | 7/1972 | Kaufman | 166/275 X |
| 3,684,014 | 8/1972 | Norton et al. | 166/273 X |
| 3,734,183 | 5/1973 | Rhudy et al. | 166/275 X |
| 3,744,566 | 7/1973 | Szabo et al. | 252/8.55 D X |

*Primary Examiner*—Stephen J. Novosad
*Attorney, Agent, or Firm*—T. H. Whaley; C. G. Reis

[57] ABSTRACT

An improved secondary recovery process which comprises injecting a viscous aqueous solution containing a beta-substituted acrylamide polymer, which can be partially hydrolyzed, if desired, into a subterranean oil-containing reservoir via an injection well, forcing the solution through the formation and recovering oil via a production well.

5 Claims, No Drawings

SECONDARY OIL RECOVERY PROCESS USING BETA-SUBSTITUTED ACRYLAMIDE POLYMERS

BACKGROUND OF THE INVENTION

1. Field of the Invention

This invention relates to an improved water-flooding process utilizing viscous flooding solutions. More particularly, this invention relates to a process in which beta-substituted acrylamide polymers are employed in order to increase the sweep and displacement efficiency of the flooding medium.

2. Prior Art

In a large number of secondary recovery processes it has been proposed to increase the viscosity of the flooding medium through the use of a wide variety of additives such as water-soluble polymers. In one particular process the polymer is an acrylamide polymer, hydrolyzed so that 10 percent or less of the amide groups are hydrolyzed to carboxyl groups; however, it has been found that such hydrolyzed polyacrylamides are absorbed by the mineral components of the formation and are gradually removed from the solution as it moves through the formation. Since the polymer is relatively expensive, the cost of such a process has proven to be excessive.

Other water-soluble polymers such as polyacrylates, polyacrylic acid, etc. have also been tried as viscosity-increasing agents for flood water; however, many of these materials precipitate in brines containing calcium or sodium salts such as are generally found in oil-producing strata.

In U.S. Pat. No. 3,039,529 the use of a highly hydrolyzed polyacrylamide polymer or copolymer has been proposed since such materials are not rendered insoluble in brines containing calcium and sodium ions nor are they absorbed to any great extent in the producing strata.

BRIEF DESCRIPTION OF THE INVENTION

In its broadest aspect, this invention relates to a process for recovering oil from an oil-bearing subterranean formation having at least one injection well in fluid communication with at least one production well which comprises:

1. injecting into the formation a flooding medium comprising an aqueous solution of a beta-substituted polyacrylamide,
2. forcing said solution through the formation, and
3. recovering oil through the production well.

A wide variety of beta-substituted polyacrylamides may be utilized in this process although a preferred class of such polymers comprises polyacrylamides substituted in the beta position to the amide group with an alkyl moiety.

The acrylamide monomers utilized in this invention have been modified so that the resulting polymers have surfactant properties which give improved oil removal while at the same time the valuable viscosity and adsorption properties of the polymers of this type are retained.

The beta-substituted polyacrylamides of this invention either in hydrolyzed or unhydrolyzed form have been found to improve the sweep and oil displacement efficiency of the flooding fluid. Also, such modified polymers exhibit improved surfactant properties since the molecule has both hydrophilic (amide function) and and organophilic (e.g., the alkyl group) regions. Free rotation about the carbon backbone allows the polymer molecule to orient itself at the boundary between oil and water in such a manner that it would present oil-soluble groups to the oil phase and water-soluble groups to the water phase. Such properties permit these materials to materially lower residual oil saturation below that obtained with conventional water-flooding fluids.

DETAILED DESCRIPTION OF THE INVENTION

An especially valuable group of polyacrylamides useful in the process of this invention include homopolymers and copolymers of monomers of the formula:
wherein R is selected from the group consisting of:

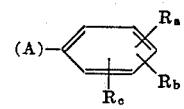

wherein $R_a$, $R_b$ and $R_c$ are selected from the group consisting of hydrogen, alkyl of from 2 to 20 carbon atoms. -OH, -SO$_3$H, -NO$_2$, and -PO(OH)$_2$ and with the proviso that the number of each of the -OH, -SO$_3$H, -NO$_2$ and -PO(OH)$_2$ substituents is not more than one, and B. 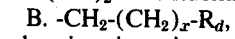

wherein $x$ is an integer of from 1 to 10, wherein $R_d$ is selected from the group consisting of -NH$_2$, -COOH, -OH, -H and -COOM wherein M is an alkali metal.

Beta substituted acrylamide monomers suitable for use in the process of this invention include for example:

beta-phenylacrylamide
beta-(3-methylphenyl)acrylamide
beta-2-hydroxy-3ethylphenyl)acrylamide
beta-(2-sulfophenyl)acrylamide
beta-(2-hexyl-3-sulfophenyl)acrylamide
beta-(3-isoctyl-4-sulfophenyl)acrylamide
beta-(2-decyl-3-sulfophenyl)acrylamide
beta-(2-ethyl-3-hydroxy-4-sulfophenyl)acrylamide
beta-(2-nitrophenyl)acrylamide
beta-(2-dodecyl-3-nitrophenyl)acrylamide
beta-(2,2Didodecyl-4-nitrophenyl)acrylamide
beta-(2-octadecyl-3-hydroxy-4-nitrophenyl)acrylamide
beta-(3-isohexyl-4-phosphonophenyl)acrylamide
beta-(2-hydroxy-3,3-dimethyl-4-phosphonophenyl)acrylamide
beta-(2-carboxyethyl)acrylamide
beta-(2-carboxyethyl)acrylamide sodium salt,
beta-(2-aminoethyl)acrylamide
beta-(7-aminoheptyl)acrylamide
beta-(2-hydroxyethyl)acrylamide
beta-(5-hydroxypentyl)acrylamide R generally will contain from 2 to about 20 carbon atoms and preferably from 2 to about 10 carbon atoms.

In preparing the acrylamide monomers useful in the invention the starting nitrile is first prepared and then subjected to a partial hydrolysis to form the corresponding amide. For example, in preparing beta-n-propyl-acrylamide (i.e., 2-hexenamide) the following sequence of reactons is utilized in preparing the nitrile via the Wittig reaction:

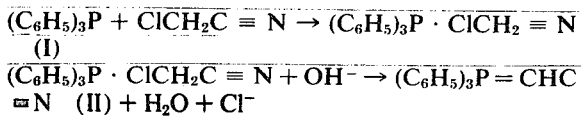

The desired monomer is then prepared as shown below:

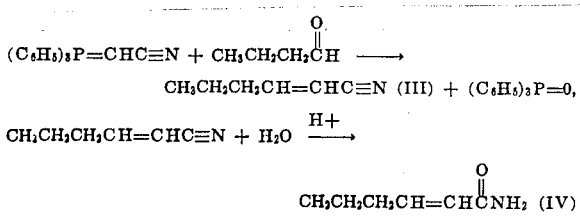

The nature of the substitutents on the polyacrylamide monomers and the type and extent of any copolymerization may be varied to achieve the desired properties of the final polymeric product. Polymerization can be achieved through any of the vinyl polymerization procedures known in the art, such as the procedures of E. R. Kolodney - U.S. Pat. No. 3,002,960 (19617. These acrylamide polymers can be prepared by adding the substituted acrylamide in aqueous solution while in the presence of a peroxide catalyst, such as alkali metal persulfate or in the presence of an organic hydroperoxide. Polymerization can also be accomplished by photo polymerization process conducted in aqueous solution with an activator such as riboflavin.

In the process of this invention hydrolyzed polyacrylamides of the type described above may also be utilized. Hydrolysis of the polyacrylamide can be carried out in any suitable fashion. For example, an aqueous solution of the polyacrylamide can be added with an appropriate amount of an alkali metal hydroxide such as sodium, potassium, or lithium hydroxide to form the desired hydrolyzed polyacrylamide. The hydrolyzed product may be utilized in this invention in the aqueous solution in which it is formed, if desired. The polyacrylamide or the hydrolyzed polyacrylamide may be dried to form a powder with a suitable drier or the product may be precipitated from solution through the addition of a water-miscible organic solvent, such as acetone, ethanol, and so forth. In preparing the solution for injection into the formation in the process of this invention the polyacrylamide product is merely dissolved in water in any desired manner to provide a solution of the required viscosity. Alternatively, the polyacrylamide may be dissolved in brine or brine may be added to an aqueous solution to form a flooding fluid more similar to the composition of the connate water in the oil field wherein the process is to be employed.

Generally, the hydrolyzed polyacrylamide will contain from about 10 to about 75 percent of the original carboxamide groups hydrolyzed to carboxyl groups and preferably this percentage will be from about 10 to about 35 mol percent. Preferably, the molecular weight of the polyacrylamides employed will be from about 3-00,000 up to about 1,400,000 or more. In preparing the polyacrylamide fluid for use in this invention it is generally desirable to employ from about 0.005 to about 0.6 percent by weight or more of the product in the driving fluid. It will be appreciated by those skilled in the art that the exact viscosity of the acrylamide solution to be employed will depend on a number of factors, such as the viscosity of the oil in the formation, chemical make-up of the oil-bearing strata, and the porosity and permeability of the formation being flooded.

It is necessary that the polyacrylamide fluid utilized be free of undissolved solids which would filter out and block the face of the formation, thus requiring excessive pressures of injection of the thickened fluid or completely stopping the injection of the fluid into the formation. It is desirable therefore that the polyacrylamide fluid before injection into the formation be passed through conventional filtration equipment employing filtering aids if necessary in order to remove substantially all undissolved solids. A number of other conventional additives such as antimicrobial agents to prevent the growth of bacteria and microorganism in the fluid, as well as sequestering agents, such as sodium ethylenediamine tetracetate may be added.

The following examples illustrate various embodiments of the invention and are to be considered not limitative.

EXAMPLE I

PREPARATION OF $(C_6H_5)_3 P = CHC \equiv N$ (I) WITTIG REAGENT

Triphenylphosphine (100 g, 0.382 moles) and chloroacetonitrile (57.7 g, 0.764 moles) were refluxed for 6 hours in about 800 ml of benzene that had been distilled from $P_2O_5$. The mixture was stirred for 15 additional hours after the heat was removed. A white precipitate, which formed during reflux, was filtered and washed with benzene to give (I), 120.7 g (95 percent). These crystals (0.36 mole) were dissolved in 2000 ml of water with stirring. Sodium hydroxide (15 g, 0.375 moles in 50 ml of water) was added and the mixture was stirred for 1 hour. The resulting white crystals were collected on a filter, washed with water, and dried under high vacuum to give (I) 99.1 g (92 percent).

PREPARATION OF 2-HEXENENITRILE (II)

The Wittig reagent, (I), (99.1 g, 0.33 mole) was added to 1,000 ml of dry benzene under a nitrogen atmosphere. Butyraldehyde (23.7 g, 0.33 mole) was added, and the mixture was refluxed for 3 hours, stirred at room temperature for 15 hours, and then refluxed for 4 more hours. The benzene was removed under vacuum. Petroleum ether was added and the mixture was filtered to remove the triphenylphospine oxide. The liquid was dried over $CaCl_2$, filtered, and the solvent was removed under vacuum. A light yellow oil (10.3 g, about 33 percent) was recovered. The oil was distilled under vacuum and the fractions from 80° to 110°C at 10 mm pressure were collected. An infrared spectrum indicated an aldehyde impurity, so the oil, in petroleum ether, was washed with an aqueous sodium bisulfite solution. The organic layer was separated, dried, and the solvent was removed. The compound was identified by unsaturation and nitrile bands in the infrared. The spectrum also indicated the presence of some amide impurity.

PREPARATION OF 2-HEXENAMIDE (III)

2-Hexenenitrile (II), (3.8 g, 0.04 mole) was added slowly to refluxing 84.5 percent sulfuric acid (4.62 g, 0.04 mole) which contained a few miligrams of copper metal. White fumes were evolved, and the mixture turned black. After 2 hours the heat was removed and calcium carbonate (8 g, 0.08 mole) was added in 50 ml of water. The mixture was filtered and acetone was added to the filtrate causing a gummy precipitate and a brown oil to form. The mixture was extracted about 5 times with 30 ml portions of acetone and these acetone portions were concentrated under vacuum until crystals formed. This suspension was added to petroleum ether (100 ml) and more crystals formed. These white crystals were filtered and washed with petroleum ether. An infrared spectrum was recorded which had bands corresponding to an ethylenic carbon-carbon bond, a carbonyl group, and an $-NH_2$ group. The melting point, 125°–126°C, agrees with the reported melting point for 2-hexenamide.

PREPARATION OF POLYMERS A & B

A 25 percent by weight solution of 2-hexenamide (i.e., beta-n-propylacrylamide) is mixed with enough copper sulfate and riboflavin to provide about 15 parts of copper ion and 30 parts of riboflavin per million parts of acrylamide monomer in the solution. The resulting mixture is irradiated with a sunlamp to induce photo-polymerization. The polymerized product is dissolved in water to form a solution having 0.325 weight percent of the polymer (Polymer A). One portion of this solution is hydrolyzed in the presence of 1.70 grams/liter of sodium hydroxide by heating at 95°C for 5 hours. To the hydrolyzed polyacrylamide solution hydrochloric acid is added and the solution is poured into an equal volume of methanol to precipitate the hydrolyzed polymer (Polymer B). On analysis of the hydrolyzed polymer, it is found that 47 percent of the carboxamide groups have been converted to carboxyl groups on the basis of nitrogen determinations.

EXAMPLE II

A flooding operation is conducted on an oil-containing reservoir in accordance with this invention. Four injection wells are arranged in a rectangular pattern around a centrally located production well. Polymer A prepared in Example I above is metered into an aqueous brine to give a polymer concentration of about 0.10 weight percent. The polymer is injected through each of the injection wells at the rate of 32 barrels per day. A substantial amount of the oil in place and other fluids are produced from the production well in conventional manner.

EXAMPLE III

A flooding operation is practiced in accordance with Example II except that a solution of Polymer B in brine (0.012 weight percent polymer) is injected into each of the four injection wells at the rate of 25 barrels per day. Appreciable amounts of the in-place oil along with other fluids are recovered via the centrally located production well.

EXAMPLE IV

The flooding operation of Example II is repeated except that after about 0.08 pore volume of the solution of Polymer B in brine is injected through the four injection wells, water is injected through each of the four inection wells at the rate of 28 barrels per day. Petroleum in a substantial amount and other produced fluids are recovered from the central producing well.

EXAMPLE V

A series of oil recovery tests are conducted with sandstone cores 1 inch in diameter by 6 inches in length. The cores are first saturated with brine and then with an Illinois crude having a gravity of 38°A.P.I. following which the cores are flooded with 0.06 weight percent brine solution of Polymer B. After 2.1 pore volumes of the polymer solution are passed through each core, it is found that an average of over 75 percent of the oil has been recovered.

What is claimed is:

1. A process for recovering oil from an oil bearing subterranean formation having at least one injection well in fluid communication with at least one production well which comprises:
  a. injecting into the formation a flooding medium comprising an aqueous solution of a beta-substituted polyacrylamide,
  b. forcing said solution through the formation, and
  c. recovering oil through the production well and wherein the said beta-substituted polyacrylamide is a polymer of a monomer of the formula:

$$RCH = CH - CONH_2,$$

wherein R is selected from the group consisting of:

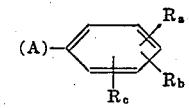

wherein $R_a$, $R_b$ and $R_c$ are selected from the group consisting of hydrogen, alkyl of from 2 to 20 carbon atoms $-OH$, $-SO_3H$, $-NO_2$ and $-PO(OH)_2$ and with the proviso that the number of each of the $-OH$, $-SO_3H$, $-NO_2$ and $-PO(OH)_2$ substituents is not more than one, and B. 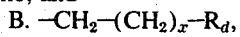

wherein $x$ is an integer of from 1 to 10, wherein $R_d$ is selected from the group consisting of $-NH_2$, $-COOH$, $-OH$ and $-COOM$ wherein M is an alkali metal.

2. The process of claim 1 wherein the beta-substituted polyacrylamide has a number average molecular weight of from about 300,000 up to 1,500,000.

3. The process of claim 1 wherein the said polyacrylamide is a polymer of 2-hexenamide.

4. The process of claim 1 wherein the beta-substituted polyacrylamide is a hydrolyzed polyacrylamide.

5. The process of claim 1 wherein the polyacrylamide is a hydrolyzed polymer of 2-hexenamide.

* * * * *